(12) United States Patent
Shaffer et al.

(10) Patent No.: US 6,377,573 B1
(45) Date of Patent: Apr. 23, 2002

(54) METHOD AND APPARATUS FOR PROVIDING A MINIMUM ACCEPTABLE QUALITY OF SERVICE FOR A VOICE CONVERSATION OVER A DATA NETWORK

(75) Inventors: Shmuel Shaffer, Palo Alto; William Joseph Beyda, Cupertino, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/097,846

(22) Filed: Jun. 15, 1998

(51) Int. Cl.[7] .................. H04L 12/66; G06F 15/16; G10L 21/04; H04B 1/38
(52) U.S. Cl. .................. 370/356; 370/521; 704/500; 709/247; 455/553
(58) Field of Search .................. 370/351–352, 370/356, 353–354, 521, 468, 493–495; 379/88.1, 93.08; 704/500, 502, 503; 714/820–822, 1–2, 6, 11, 48; 455/66, 74, 72, 101, 553; 375/299, 347; 709/247

(56) References Cited

U.S. PATENT DOCUMENTS

| 5,546,395 A | 8/1996 | Sharma et al. ............... 370/468 |
| 5,550,893 A | 8/1996 | Heidari ....................... 455/553 |
| 5,742,773 A | * 4/1998 | Blomfield-Brown et al. .... 704/500 |
| 6,006,179 A | * 12/1999 | Wu et al. .................... 704/205 |
| 6,151,636 A | * 11/2000 | Schuster et al. ............ 709/247 |
| 6,178,405 B1 | * 1/2001 | Ouyang et al. ............. 704/500 |

FOREIGN PATENT DOCUMENTS

| WO | WO 97/27692 | * 7/1997 | ........... H04L/12/56 |

* cited by examiner

*Primary Examiner*—Wellington Chin
*Assistant Examiner*—Maikhanh Tran

(57) ABSTRACT

A method and apparatus for transmitting delay-sensitive data over a packet-based network involve converting the delay-sensitive data into two versions for transfer through the network with one version of the data being used to supplement the other version of the data in the event that packets are delayed or lost. In a preferred embodiment, real time voice conversation data is compressed using two different compression algorithms, where one version is more highly compressed and of a lower quality than the other. The highly compressed data is sent before corresponding packets from the less compressed data and the highly compressed packets are buffered at the receiving device to be utilized to regenerate any data segments from the less compressed packets that are lost or delayed during transmission. Sending dual versions of the same data allows the lower quality voice segment to be used as a backup in places where the high quality voice segments are lost.

20 Claims, 3 Drawing Sheets

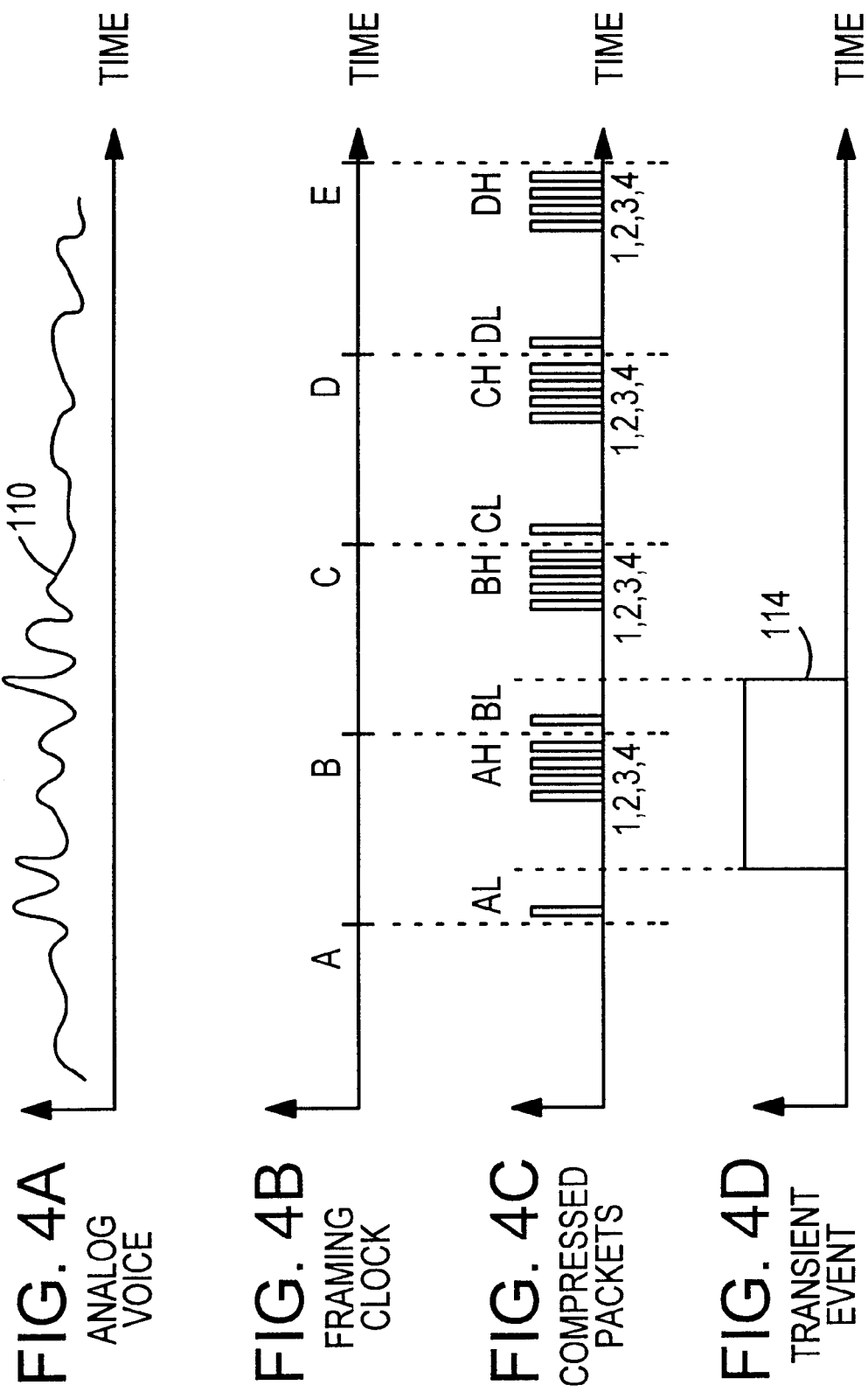

METHOD AND APPARATUS FOR PROVIDING A MINIMUM ACCEPTABLE QUALITY OF SERVICE FOR A VOICE CONVERSATION OVER A DATA NETWORK

BACKGROUND OF THE INVENTION

The invention relates generally to data network telephony. More particularly the invention relates to providing a minimum acceptable quality of service for a voice conversation conducted over a data network.

DESCRIPTION OF THE RELATED ART

The publicly switched telephone network (PSTN) is a circuit switched network that has been optimized for real time or synchronous voice communication with a guaranteed quality of service (QoS). When a telephone call is initiated, a circuit is established between the calling party and the called party and the PSTN guarantees QoS by dedicating a full duplex circuit between parties of a telephone conversation. Regardless of whether or not parties are speaking or silent, they are occupying the entire dedicated circuit until the call ends. Since the occupied bandwidth remains constant, the cost of a telephone call on the PSTN is based on distance and time.

On the other hand, typical data networks are packet switched networks that have been used for applications such as e-mail and file transfers where a variable QoS is tolerable. Typical packet switched networks do not dedicate a path between a sender and a receiver and therefore it is harder to guarantee a particular QoS. As data networking technology has improved, the ability to conduct real time conversations over data networks has been developed. By conducting conversations over data networks, access to a PSTN may not be needed and PSTN charges may be avoided. For example, many corporations have extensive enterprise data networks that have untapped capability to carry voice conversations in addition to the data that is being exchanged throughout the network. By channeling voice traffic onto a data network, a corporation may be able to significantly reduce PSTN expenses.

In data networks that transfer data packets according to the popular Internet Protocol (IP), conducting real time voice conversations over a data network is commonly referred to as IP telephony. The term IP telephony is used in the present specification to refer generally to all real time voice conversations conducted through a data network. Besides private data networks such as enterprise networks, IP telephony can be carried out over the global Internet, which also allows users to avoid PSTN expenses beyond the expenses related to Internet access.

Although IP telephony has many advantages, it also has some disadvantages. The main disadvantage of IP telephony is the unpredictable QoS that is provided. The unpredictability is predominantly a result of bandwidth limitations and latency. Bandwidth limitations and latency are often tied together, since when there is insufficient bandwidth in a network to transfer a voice conversation at a desired rate, some packets may be delayed in the transmission to the destination or some packets may be dropped altogether from the transfer because they have taken too much time to be transferred. When packets generated from a voice conversation are delayed or dropped, the quality of the voice conversation carried over the network declines.

One conventional technique used to minimize bandwidth limitations and latency problems in the transmission of voice conversations over a data network is data compression. Data compression allows the amount of voice data from a conversation to be reduced into a smaller number or smaller sized packets for transfer through a network. One problem with compression/decompression algorithms is that the more compressed the data is, the harder it is to decompress the data into an exact replica of the original voice data. As a result, there is a tradeoff between the compression ratio applied to a voice conversation and the quality of the decompressed product.

In order to match the optimal compression ratio to the current bandwidth capacity of a network that is used for voice conversations, systems have been designed that intelligently negotiate and terminate a current compression/decompression algorithm in favor of a more appropriate algorithm depending on current network traffic conditions. An example of a dynamically changing compression/decompression algorithm system is disclosed in U.S. Pat. No. 5,546,395, entitled "Dynamic Selection of Compression Rate for a Voice Compression Algorithm in a Voice Over Data Modem," issued to Sharma et al. (hereafter Sharma). Although Sharma may work well for its intended purpose, the transition between compression/decompression algorithms typically costs valuable setup time that degrades voice conversation quality.

In view of the current bandwidth limitations and latency involved with IP telephony and the disadvantages of compression/decompression negotiation, what is needed is a method and apparatus for conducting voice conversations over a data network, with sufficient quality and reliability.

SUMMARY OF THE INVENTION

A method and apparatus for transmitting delay-sensitive data over a packet-based network involves converting the delay-sensitive data into two versions for transmission through the network and then using one of the two versions to regenerate the original delay-sensitive data and using the other version to supplement the regeneration of the delay-sensitive data when necessary to compensate for transmission errors or delay that occur during the transmission of the version that was initially used for regeneration. In a preferred embodiment, the delay-sensitive data represents a real time voice conversation and the two versions of the delay-sensitive data include the same segments of the conversation that have been compressed into packets using two different compression algorithms. The first version of the delay-sensitive data is more highly compressed than the second version and because of compression/decompression inefficiencies, the first version provides a lower quality reproduction of the original voice conversation than the second version. Although the first version is of a lower quality, it consumes less bandwidth and has lower latency when transmitted over the network, relative to the more voluminous high quality second version. The low quality version is then used to fill in voice data gaps that are caused when the high quality version does not arrive at its destination on time.

To optimize the quality of the voice conversation, packets from the highly compressed version of the data are sent before packets from the less compressed version, where both sets of packets represent the same segment of the voice conversation. The highly compressed packets are buffered at the receiving end in case they are needed to supplement the less compressed version. Packets from the less compressed version are utilized whenever possible to regenerate the conversation at the receiving end of the transmission, however if packets from the less compressed version are overly delayed or are dropped, then the corresponding packets from the highly compressed version of the data are supplemented to regenerate the segments of the conversation that would otherwise have been lost or distorted.

The preferred method of the invention is applicable to any packet-based network where the term packet includes data segments referred to as cells, frames, etc. Network protocols applicable to the invention include Internet protocol-based networks, ethernet networks, token ring networks, frame relay networks, and asynchronous transfer mode (ATM) networks.

An IP telephony device designed to enable data transmission in accordance with the invention includes a microphone, a speaker, a converter, memory, a processor, a compression unit, a decompression unit, and a transceiver. The speaker and microphone are conventional devices that are used to send and receive audio information in the frequency range of normal conversation. The converter is a conventional device that converts analog information to digital information and converts digital information to analog information. The converter interfaces with the speaker and the microphone to convert analog voice data from the microphone into digital voice data for the IP telephony device and to convert digital voice data from the IP telephony device to analog voice data for the speakers. The memory is conventional memory that is used to buffer incoming and/or outgoing packets. The processor performs data management functions which include controlling the flow of data between the functional units of the IP telephony device. The compression unit compresses the digital voice data into packets before the packets are sent to a receiving device, and the decompression unit decompresses compressed packets that are received from a sending device. The transceiver includes any conventional device, such as a network interface card or a modem that sends and receives packets of data to and from the data network. Although the components of the IP telephony device are described separately, the functions of the components can be incorporated into a single device or groups of devices other than as explained.

BRIEF DESCRIPTION OF THE DRAWINGS

FIG. 4A is a time-line of analog voice data.

FIG. 4B is a time-line related to the time-line of FIG. 4A that shows framing clocks used for packetizing the analog data of FIG. 4A.

FIG. 4C is a time-line related to the time-line of FIGS. 4A and 4B that shows one low quality packet to every four high quality packets of the packetized analog voice data from FIG. 4A.

FIG. 4D is a time-line related to the time-lines of FIG. 4A–4C that shows an exemplary transient event that disrupts the transmission of some packetized data.

DETAILED DESCRIPTION

Figure 1:
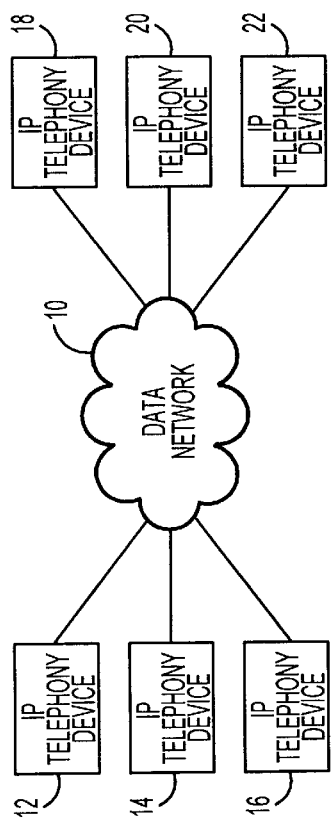
FIG. 1 is a depiction of a data network that enables voice conversations between IP telephony devices in accordance with the invention.

FIG. 1 is a depiction of a data network 10 that connects six IP telephony equipped devices 12, 14, 16, 18, 20, and 22.

In the depicted embodiment, the network is a corporate enterprise network that transfers packets of information according to IP, although other network protocols are possible. Although depicted as a corporate enterprise network, the network can be any network that is able to carry packetized data, such as the global Internet, where a packet refers to any segment of data including cells and frames. In addition, the data network may transfer data according to protocols such as ethernet, frame relay, or ATM.

The six IP telephony devices 12–22 are preferably personal computers or work stations that are equipped with IP telephony capability and the specifics of the specially equipped devices are discussed in detail below. Although IP telephony equipped computers and work stations are described, the IP telephony devices can alternatively be any IP telephony equipped devices, such as IP specific telephones or hand-held computers. Further, although the IP telephony devices are depicted as physically connected to the network 10, the IP telephony devices may alternatively have wireless connections to the network.

Figure 2:
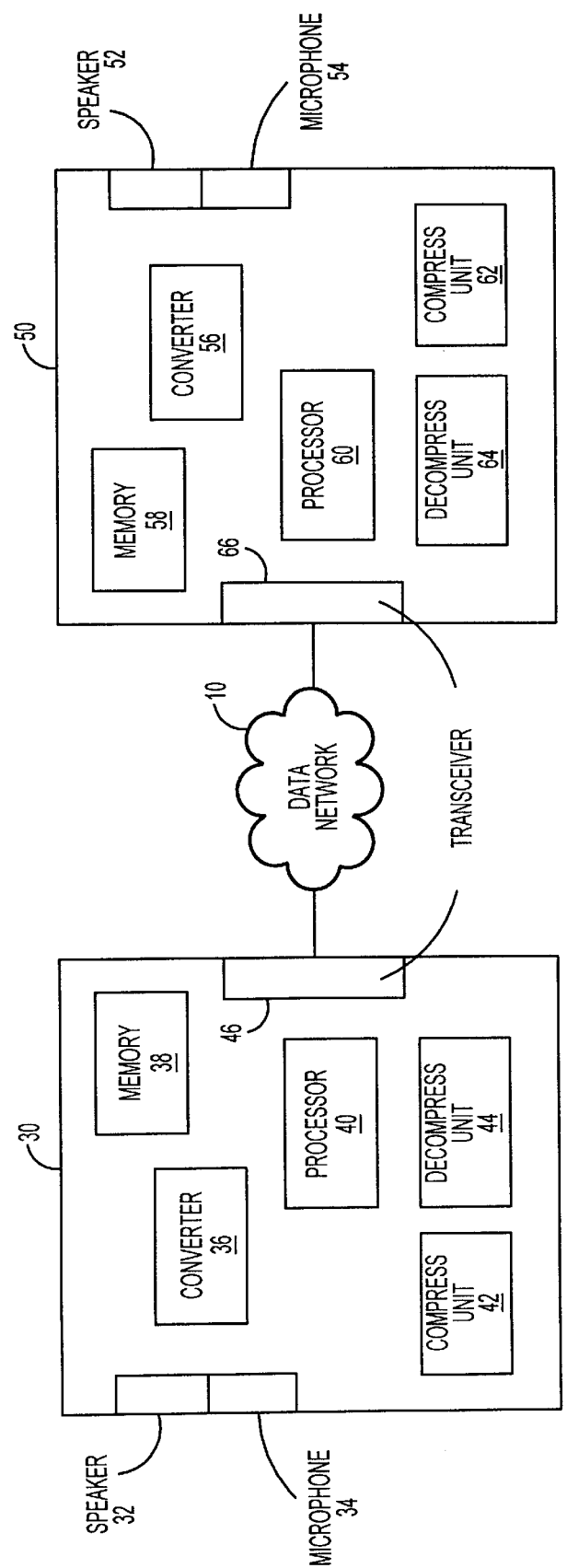
FIG. 2 is an expanded depiction of two IP telephony devices equipped to enable voice conversation in accordance with the invention.

FIG. 2 is a depiction of two identical IP telephony devices 30 and 50 that are equipped in accordance with the invention and that are connected to the data network 10 of FIG. 1 to enable IP telephony communication in accordance with the invention. The individual functional units of the devices are first described with reference to IP telephony device 30 and then the preferred method of the invention is described with reference to both devices 30 and 50. The IP telephony device 30 includes a speaker 32, a unit 42, a decompression unit 44, and a transceiver 46. The IP telephony device 50 has the following corresponding functional units; a speaker 52, a microphone 54, a converter 56, memory 58, a processor 60, a compression unit 62, a decompression unit 64, and a transceiver 66.

The speaker 32 and microphone 34 are conventional devices that are used to send and receive audio information in the frequency range of normal conversation. The converter 36 is a conventional device that converts analog information to digital information and converts digital information to analog information. The converter interfaces with the speaker and the microphone to convert analog voice data from the microphone into digital voice data for the IP telephony device and to convert digital voice data from the IP telephony device to analog voice data for the speaker. The memory 38 is conventional memory such as dynamic random access memory (DRAM) that is used to buffer incoming and/or outgoing packets. Although the memory is preferably DRAM, other types of memory may be utilized.

The processor 40 performs data management functions such as directing data flow between the functional units of the IP telephony device. A more detailed explanation of the management functions is provided below in the description of the preferred method of the invention. The compression unit 42 of the device 30 compresses digital voice data into packets before the data is sent to a receiving device, and the decompression unit 44 decompresses previously compressed packets that are received from a sending device. There are many known compression/decompression algorithms that are applicable to compressing different types of data such as voice conversation or video conferencing. Selecting an appropriate compression algorithm depends on factors such as the available bandwidth of the network, delay tolerances, and the desired quality of the decompressed product. For example, a segment of data that is highly compressed data can be transferred over a network using less bandwidth and with less delay but will be of lower quality when decompressed and converted into sound. The quality of the decompressed voice data degrades because some bits of data are discarded during compression and inaccurately regenerated during decompression. In contrast, data that is less compressed has more delay and requires more bandwidth to transfer, but will have a higher quality when decompressed and converted into sound.

The transceiver 46 includes any conventional device such as a network interface card (NIC) or a modem that sends and receives packets of data to and from the data network. Although the components of the IP telephony device 30 are described separately, the function of the components can be incorporated into the same device or groups of devices. For example, a single component may perform the conversion functions, the compression/decompression functions, and the processor functions and, as will become apparent, the exact layout of the device is not critical to the invention.

Figure 3:
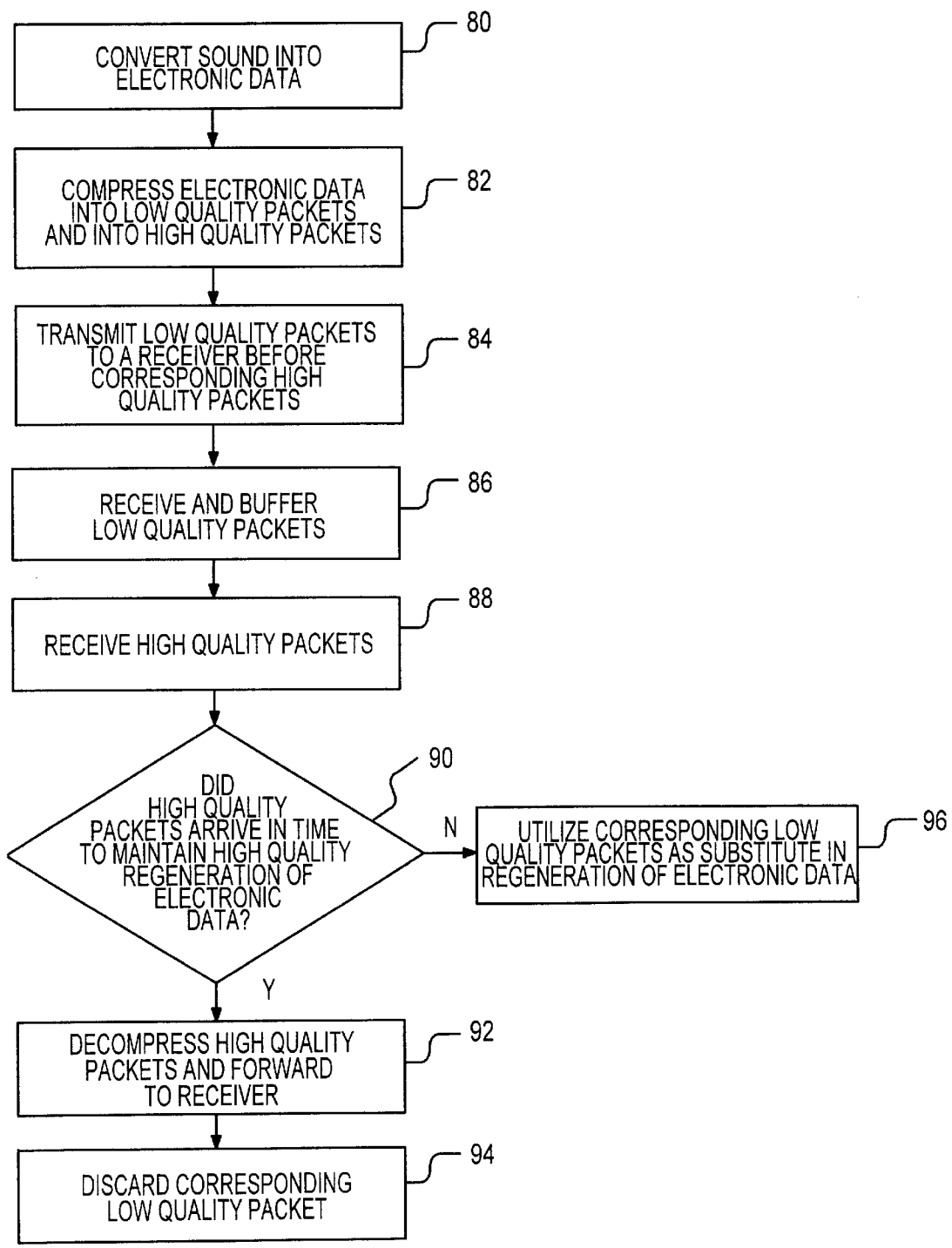
FIG. 3 is a process flow of a method for conducting a voice conversation between two devices, such as the devices of FIG. 2, in accordance with the invention.

FIG. 3 is a process flow diagram used to describe the method of the invention. FIG. 4A is an exemplary depiction of analog voice data 110 versus time, FIG. 4B is a depiction of a series of framing clocks that are used to packetize the analog voice data of FIG. 4B, and FIG. 4C is a depiction of dual sets of packetized analog voice data from FIG. 4A using the framing clock of FIG. 4B, all of which are used to describe the method of the invention. The method of the invention is also described in terms of the IP telephony devices 30 and 50 of FIG. 2 although the devices of FIG. 2 are not the only devices that can be used to carry out the method of the invention.

To begin the method of the invention, a voice conversation between a talker and a listener is initiated by the talker using a respective IP telephony supported microphone 34. In a first step 80 of the method, the analog audio voice data from the talker, as shown in FIG. 4A, is converted into electronic voice data by the microphone and then into digital voice data by the converter 36.

In a next step 82, each segment, as defined by the framing clocks of FIG. 4B, of the voice data is compressed into a low quality version of the voice data and into a high quality version of the voice data by the compression unit 42. As a result of the two compression processes, each original segment of electronic voice data is simultaneously represented in FIG. 4C by one low quality packet and four high quality packets. The low quality packets are labeled as AL, BL, CL, and DL, where AL is the one low quality packet generated from framing clock A and so on. The high quality packets are labeled as AH, BH, CH, and DH, where AH represents the four high quality packets generated from framing clock A and so on.

In a next step 84, packets from the low quality version of the electronic voice data are sent to the listener's device 50, followed by the corresponding packets from the high quality version of the electronic voice data. The low quality version packets are transmitted first because their smaller size enables the low quality packets to pass through the network 10 at a higher transmission rate, thereby providing the listener's device with a more reliable albeit lower quality source of the voice data.

The transmission pattern of dual versions of the compressed data is repeated as the conversation continues, but because data networks handle each packet of data as a unique unit, the packets do not necessarily arrive at the listener's device 50 in the same order and at the same time intervals as originally sent, though it is likely that they do.

In a next step 86, the low quality packets from the low quality version of the voice data are received at the listener's device 50 before corresponding high quality packets from the high quality version of the voice data. As the low quality version of the voice data is received at the listener's device, the low quality version packets are buffered in a memory 58. Depending on the processing capability of the device, the low quality version may be initially decompressed prior to buffering, but this is not critical to the invention. In a next step 88, the high quality version of the voice data is received at the listener's device and the high quality packets are decompressed by the decompression unit 64 according to the specific algorithm that was initially used to compress the high quality version of the electronic voice data.

At decision point 90, the processor 60 helps to determine whether or not the high quality packets have arrived at the receiving device in time to maintain a minimum quality regeneration of the electronic voice data. A minimum quality regeneration will not be achieved if packets arrive too late or not at all. If the high quality packets arrive at the receiving device in time, at step 92, the high quality packets are decompressed to regenerate the original electronic voice data and the data is forwarded within the receiving device, so that the original electronic voice data can be transformed into the original audio data and output onto the speaker 52. If the high quality packets do not arrive at the receiving device 50 in time, at step 96, the corresponding low quality packets are utilized as substitutes to regenerate the original electronic voice data and subsequently the original audio data. Even though the low quality data may not provide as sharp of a reproduction of the original electronic voice data as the high quality data, at least the segment of electronic voice data can be reproduced and inserted into the flow of data to maintain the continuity of the ongoing voice conversation. In the case where the high quality packets are utilized for a segment of conversation, at step 94 the corresponding low quality packets are preferably discarded from the buffer memory.

The arrivals of the high quality packets and the low quality packets are continuously monitored by the receiving, or listener's, device so that the receiving device can determine when to switch from the high quality packets to the low quality packets. In addition, monitoring allows the receiving device to determine when to transition back from the low quality packets to the high quality packets.

FIG. 4D is an example depiction of how the method of the invention can operate to enable a reliable real time conversation over a packet based network even when an unpredictable event disrupts network traffic flow. As can be seen, a transient event 114 that disrupts network traffic flow occurs during portions of framing clocks A and B. The transient event is some event that either causes the packets within the time window to be delayed or to be dropped altogether. The transient event in FIG. 4D causes the high quality packets AH from framing clock A and the low quality packet BL from framing clock B to be lost. In a normal transmission where only one packet sequence is sent, the quality of the voice data output from the receiving device would be degraded, possibly beyond recognition if the packets represent a long enough time period. However, since the low quality packet AL from framing clock A and the high quality packets BH from framing clock B are transmitted successfully without too much delay, the entire sequence of analog voice data can be regenerated by combining the low quality packet from framing clock A with the high quality packets from framing clocks B through D. If a transient event is so large that it covers both sets of compressed data, then the affected segments may be lost in spite of the dual transmission approach.

The method of the invention is especially useful when applied to networks that can provide a specific QoS. For example, some networks can guarantee bandwidth on a tiered pricing basis where larger amounts of guaranteed bandwidth are more expensive. In this situation, the low quality, low delay, packets can be transferred via the expensive network with guaranteed bandwidth while the high quality, high delay, packets can be transferred via a lower cost network where bandwidth may not be guaranteed. Under this approach, the conversation has high quality when economical bandwidth is available, yet the conversation is also maintained at a lower quality when economical bandwidth is not available. In some cases, both the high quality and the low quality packets are transferred over the exact same route within the network and a resource reservation protocol (RSVP) is used to reserve specified amounts of bandwidth for the designated high quality and low quality traffic.

An advantage of the invention is that less data from a voice conversation is lost because substitute data is sent in parallel with the preferred high quality version of the data. Even though the substitute data is of a lower quality, it is better to fill in the conversation with low quality data than to have voice data gaps which may cause the conversation to be distorted or unintelligible. Another advantage of the invention is that networks providing a guaranteed quality of service can be intelligently utilized to manage IP telephony in a manner that consumes lower cost bandwidth when available while consuming only enough high cost bandwidth to maintain a minimum level of conversation quality. Further, the improved quality and reliability achieved through the invention enable IP telephony to be implemented in corporate enterprise networks, thereby minimizing PSTN expenses.

Although the preferred embodiment of the invention is described with reference to real time voice conversations and IP telephony, the method of the invention is also applicable to other delay-sensitive data transmissions over packet based networks such as video teleconferencing or video broadcasting. The dual mode transmission approach may also apply to other data transfers as bandwidth reservation becomes more widely available.

What is claimed is:

1. A method for ensuring the transmission of delay-sensitive data over a packet based network comprising the steps of:
    generating delay-sensitive data at an output device;
    converting said delay-sensitive data into a first version for transmission to an input device;
    converting said delay-sensitive data into a second version for transmission to said input device;
    transmitting said first version and second version of said delay-sensitive data to said input device;
    regenerating said delay-sensitive data from said second version, thereby forming regenerated data at said input device; and
    supplementing said regenerated data with data regenerated from said first version to compensate for transmission delays that occur during said transmission of said second version.

2. The method of claim 1 wherein said step of converting said delay-sensitive data into said first version includes a step of compressing said delay-sensitive data into a first compressed version using a first compression algorithm.

3. The method of claim 2 wherein said step of converting said delay-sensitive data into said second version includes a step of compressing said delay-sensitive data into a second compressed version using a second compression algorithm.

4. The method of claim 3 wherein said first compression algorithm has a higher compression ratio than said second compression algorithm.

5. The method of claim 4 wherein said step of transmitting includes a step of transmitting said first version of said delay-sensitive data to said input device before transmitting said second version to said input device.

6. The method of claim 5 further including a step of buffering said first version at said input device for use in said step of supplementing.

7. The method of claim 5 further including a step of maintaining parallel connections between said output device and said input device for transmitting said first version and said second version.

8. The method of claim 1 wherein said step of generating said delay-sensitive data includes processing one of a voice conversation and a video stream.

9. An apparatus for enabling a voice conversation over a packet based data network comprising:
    means for generating electronic voice data;
    means for compressing said electronic voice data into a first compressed version;
    means for compressing said electronic voice data into a second compressed version that is less compressed than said first version;
    means for transmitting said first compressed version over said data network before said second compressed version;
    means for regenerating said electronic voice data from said second compressed version; and
    means for supplementing said regeneration of said electronic voice data from said second compressed version with said first compressed version when said second compressed version does not arrive from said data network in a manner to maintain a minimum level of data transmission quality.

10. The apparatus of claim 9 further including a microphone and a speaker.

11. The apparatus of claim 10 wherein said means for supplementing includes memory for buffering said first compressed version of said electronic voice data.

12. The apparatus of claim 11 further including a means for generating audio voice data from said regenerated electronic voice data.

13. A method for improving the quality of a delay-sensitive data transmission between an output device and an input device through a data network comprising the steps of:
    generating a segment of delay-sensitive data;
    compressing said segment of delay-sensitive data into a first compressed version according to a first compression algorithm;
    compressing said segment of delay-sensitive data into a second compressed version according to a second compression algorithm wherein said first version is more highly compressed than said second version;
    transmitting said first compressed version of said segment of delay-sensitive data from said output device to said input device;
    transmitting said second compressed version of said segment of delay-sensitive data from said output device to said input device;
    utilizing said second compressed version in a first attempt to regenerate said segment of delay-sensitive data; and
    utilizing said first compressed version in a second attempt to regenerate said segment of delay-sensitive data when said first attempt is unsuccessful in achieving a minimum level of data transmission quality.

14. The method of claim 13 wherein said step of transmitting said first compressed version is performed before said step of transmitting said second compressed version.

15. The method of claim 14 further comprising a step of monitoring the arrival of said second compressed version at said input device to determine when to utilize said first version in place of said second version.

16. The method of claim 14 wherein said step of utilizing said first compressed version includes a step of decompressing said first compressed version in order to regenerate said segment of delay-sensitive data and said step of utilizing said second compression version includes a step of decompressing said second compressed version in order to regenerate said segment of delay-sensitive data.

17. The method of claim 14 wherein said step of transmitting said first compressed version is a step of utilizing a relatively high cost transmission mode and wherein said step of transmitting said second compressed version is a step of utilizing a relatively low cost transmission mode.

18. The method of claim 13 wherein said step of generating a segment of delay-sensitive data includes a step of transforming sound waves into electronic data.

19. The method of claim 13 wherein said step of generating a segment of delay-sensitive data includes a step of generating video data.

20. The method of claim 13 wherein said steps of transmitting include preceding steps of formatting said first and second compressed versions according to the Internet Protocol (IP).

* * * * *